United States Patent

[11] 3,607,841

| [72] | Inventors | Masataka Nakahara<br>Takatsuki;<br>Yasuhiro Ogawa, Suita, both of Japan |
| --- | --- | --- |
| [21] | Appl. No. | 710,776 |
| [22] | Filed | Mar. 6, 1968 |
| [45] | Patented | Sept. 21, 1971 |
| [73] | Assignee | Kanegafuchi Boseki Kabushiki Kaisha<br>Tokyo, Japan |
| [32] | Priority | Mar. 22, 1967 |
| [33] | | Japan |
| [31] | | 42/17832 |

[54] PRODUCTION OF POLY-$\alpha,\alpha$-DISUBSTITUTED-$\beta$-PROPIOLACTONES
5 Claims, No Drawings

[52] U.S. Cl. .................................................. 260/78.3, 260/9.5
[51] Int. Cl. ......................................................... C08g17/017
[50] Field of Search ........................................... 260/78.3, 484, 473

[56] References Cited
UNITED STATES PATENTS

| 2,311,534 | 2/1943 | Gleason.......................... | 260/78.3 |
| --- | --- | --- | --- |
| 3,471,456 | 10/1969 | Klootwijk et al............... | 260/78.3 |

FOREIGN PATENTS

| 1,128,137 | 9/1968 | Great Britain................ | 260/78.3 |
| --- | --- | --- | --- |

*Primary Examiner*—Harold D. Anderson
*Assistant Examiner*—E. Nielsen
*Attorneys*—Harry C. Bierman, Jordan B. Bierman and Bierman & Bierman

ABSTRACT: A method of producing poly-$\alpha,\alpha$-disubstituted-$\beta$-propiolactones by ring-opening polymerizing a compound of the formula wherein $R_1$ and $R_2$ are aryl or alkyl having 1-4 carbon atoms, in the presence of an anionic polymerization catalyst, characterized by conducting the polymerization in the presence of a molecular weight controlling agent selected from the group consisting of acid anhydrides, aldehydes, sulfoxides, organic acids and phenolic compounds in order to control the molecular weight of the polymer.

PRODUCTION OF POLY-$\alpha,\alpha$-DISUBSTITUTED-$\beta$-PROPIOLACTONES

This invention relates to a process for producing high molecular weight poly-$\alpha$, $\alpha$-disubstituted-$\beta$-propiolactones. More particularly the present invention relates to a process of producing poly-$\alpha$, $\alpha$-dialkyl$\beta$-propiolactones having a controlled molecular weight characterized by using, as a molecular weight-controlling agent (chain increasing agent), a compound selected from the group consisting of acid anhydrides, aldehydes sulfoxides, organic acids and phenolic compounds in the ring-opening polymerization of an $\alpha,\alpha$-dialkyl-$\beta$-propiolactone in the presence of an anionic polymerization catalyst.

It is already known that a higher polymer is obtained when an $\alpha,\alpha$-dialkyl-$\beta$-propiolactone is polymerized in the presence of an anionic polymerization catalyst. For example, in British Patent No. 766,347, there is disclosed a method of polymerizing $\alpha,\alpha$-dimethyl-$\beta$-propiolactone by using a tertiary amine, potassium hydroxide or potassium acetate as a polymerization catalyst. Further, in French Patent No. 1,231,163, there is proposed a method of polymerizing $\alpha$, $\alpha$-disubstituted-$\beta$-propiolactones by using an amine, metallic sodium or sodium amide as a polymerization catalyst.

However, in the polymerization of an $\alpha$, $\alpha$-dialkyl-$\beta$-propiolactone, it is difficult to control the polymerizing velocity and the molecular weight of the polymer. No method has heretofore been proposed as to controlling molecular weight of the polymer as desired with a proper polymerizing velocity.

It is known to use a chain transfer agent to control the molecular weight of a polymer in a radical or ionic chain polymerization of a vinyl-type monomer. However, it is not known to control the molecular weight by using a chain transfer agent in the ring-opening polymerization of $\beta$-lactones. Further, it is not known to control the molecular weight of a poly-$\alpha,\alpha$-disubstituted-$\beta$-propiolactone.

Generally there are very few technical references to the ring-opening polymerization of $\beta$-lactones. Particularly, so far as we know, there is substantially no patent or other literature discussing the variation in the polymerizing velocity and molecular weight in relation to the polymerizing mechanism and condition in the polymerization of $\alpha$, $\alpha$-dialkyl-$\beta$-propiolactones.

The molecular weight of a polymer affects many of its physical properties, for example, the toughness and melt viscosity. A polymer to be used in injection molding requires a low melt viscosity. On the other hand, a polymer to be used for forming films requires a high melt viscosity. Thus, there are required polymers of various molecular weights depending upon the use of the polymers.

However, in the known method of polymerizing $\alpha$, $\alpha$-disubstituted-$\beta$-propiolactones, there are disadvantages in that it is difficult to produce a polymer of a desired and controlled degree of polymerization. The purity of a monomer will considerably influence the degree of polymerization and the reproduceability of the degree of polymerization will be poor if the monomer is not pure.

We have made extensive researches on the conditions for polymerizing $\alpha$, $\alpha$-disubstituted-$\beta$-propiolactones, and have found that there are certain compounds which enable control of polymer molecular weight as desired without adversely influencing the polymerizing velocity in the polymerization in the presence of a known anionic polymerization catalyst.

Primary object of this invention is to produce a poly-$\alpha$, $\alpha$-dialkyl-$\beta$-propiolactone having a controlled molecular weight.

Another object of this invention is to produce poly-$\alpha\alpha$-dialkyl-$\beta$-propiolactones useful for forming fibers, films and other shaped articles.

Briefly the method of the present invention is characterized by the use of a compound selected from the group consisting of acid anhydrides, aldehydes, sulfoxides, organic acids and phenolic compounds as chain increasing agent (molecular weight controlling agent) in polymerizing an $\alpha$, $\alpha$-disubstituted-$\beta$propiolactone in the presence of an anionic polymerization catalyst.

Examples of acid anhydrides to be used in this invention are acetic anhydride, propionic anhydride, butyric anhydride, isovaleric anhydride, caproic anhydride, enanthic anhydride, palmitic anhydride, stearic anhydride, succinic anhydride and phthalic anhydride.

Examples of aldehydes which may be used in the invention are acetaldehyde, propionaldehyde, butyraldehyde, valeraldehyde, caproaldehyde, enanthaldehyde, caprylaldehyde, pelargonaldehyde, caprinaldehyde, palmitaldehyde, stearaldehyde and benzaldehyde.

For the sulfoxides are used, for example, dimethyl sulfoxide and diethyl sulfoxide.

Among organic acids which may be used in carrying out the method of this invention are, for example, acetic acid, propionic acid, butyric acid, valeric acid, caproic acid, enanthic acid, pivalic acid, capric acid, palmitic acid, stearic acid, benzoic acid phenylacetic acid, phthalic acid, $\beta$-monochloropivalic acid, $\beta$-dichloropivalic acid, trichloropivalic acid, $\beta$-acetoxypivalic acid, monochloracetic acid, dichloracetic acid, trichloracetic acid and trifluoracetic acid.

For the phenolic compounds can be enumerated, for example, phenol, cresol, resorcinol, xylenol and chlorophenol. But, needless to say, the invention is not limited to them.

The amount of such chain increasing agent or molecular weight controlling agent to be added to the polymerization reaction system varies depending on the polymerizing conditions such as the kinds and amounts of the anionic polymerization catalyst and solvent, polymerization temperature, monomer concentration and also on the desired molecular weight. However, it is usual to use the same in an amount of $10^{14}$ to $10^3$ percent by weight, preferably $10^{13}$ to $10^2$ percent by weight on the monomer used.

The monomeric $\alpha$, $\alpha$-disubstituted-$\beta$-propiolactone to be used in the present invention is represented by the general formula:

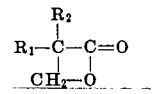

wherein each of $R_1$ and $R_2$ is an aryl group or alkyl group of 1 to 4 carbon atoms.

Examples of such propiolactones are $\alpha$, $\alpha$-dimethyl-$\beta$-propiolactone, $\alpha$-methyl-$\alpha$-ethyl-$\beta$-propiolactone, $\alpha$-methyl-$\alpha$-propyl-$\beta$-propiolactone, $\alpha$-methyl-$\alpha$-butyl-$\beta$propiolactone, $\alpha$, $\alpha$-diethyl-$\beta$-propiolactone, $\alpha$-ethyl-$\alpha$-propyl-$\beta$-propiolactone, $\alpha$-ethyl-$\alpha$-butyl-$\beta$-propiolactone, $\alpha$, $\alpha$-dipropyl-$\beta$-propiolactone, $\alpha$-propyl-$\alpha$-butyl-$\beta$-propiolactone, $\alpha$, $\alpha$-dibutyl-$\beta$-propiolactone, $\alpha$-methyl-$\alpha$-phenyl-$\beta$-propiolactone, $\alpha$-ethyl-$\alpha$0phenyl-$\beta$-propiolactone, $\alpha$-propyl-$\beta$-phenyl- $\beta$-propiolactone, $\alpha$-butyl-$\alpha$-phenyl-$\beta$-propiolactone or $\alpha$, $\alpha$-diphenyl$\beta$-propiolactone.

Any anionic polymerization catalyst known in the art of the polymerization of $\alpha$, $\alpha$-disubstituted-$\beta$-propiolactones can be used. Examples of such catalysts are tertiary amines, organic salts, organic metal compounds, Grignard's reagents, phosphines, arsines, stibines and sulfonium compounds.

For the above-metnioned tertiary amines may be used, for example, hexamethylene tetramine, trimethylamine, triethylamine, tri-n-propylamine, triisopropylamine, tri-n-butylamine, dimethylaniline, triethylenediamine and N-ethylpiperazine.

Examples of the organic acid salts are sodium salts, potassium salts or tetralkylammonium salts of acetic acid, propionic acid, butyric acid and caproic acid.

As for the organic metal compounds, there may be mentioned, for example, butyl lithium, phenyl lithium, naphthyl lithium, diethyl zinc, diethyl cadmium, tributyl boron, triethyl aluminum and triisobutyl aluminum.

For the Grignard's reagents, phenyl magnesium bromide and butyl magnesium iodide may be exemplified.

For the sulfonium compounds may be used, for example, trimethyl sulfonium iodide and triethyl sulfonium iodide.

Examples of the phosphines are trimethyl phosphine, triethyl phosphine, tri($\beta$-chlorethyl)phosphine, tripropyl phosphine, methyldiethyl phosphine, tri-n-butyl phosphine and triphenyl phosphine.

For the arsines, there may be mentioned, for example, trimethyl arsine, triethyl arsine, tripropyl arsine, methyldiethyl arsine, tri-n-butyl arsine and triphenyl arsine.

For the stibines are used, for example, trimethyl stibine, triethyl stibine, tripropyl stibine, tri($\beta$-chlorethyl) stibine, tri-n-butyl stibine, triphenyl stibine and methyldiethyl stibine.

Among the above-mentioned anionic polymerization catalysts, the tertiary amines are most preferable.

The amount of the anionic polymerization catalyst may be in the range of 0.005 to 5.0 percent by weight, preferably 0.01 to 1.0 percent by weight based on the monomer.

The polymerization temperature may be 0° to 150° C. or preferably 50° to 120° C. The polymerization temperature has a close relation with the polymerizing velocity and should therefore be selected depending on the kind and amount of the polymerization catalyst so as to obtain a proper reaction velocity.

A solvent is not always necessary. However, in order to remove reaction heat, it is preferable to use an inert solvent. For the same reason, it is more preferable to stir the polymerization system.

It is also preferable to carry out the polymerization in a reaction vessel made of stainless steel and provided with a stirrer which can scrape the wall of the vessel, a jacket and a reflux condenser.

The polymerization may be conducted for a sufficient time to obtain a polymer of a desired molecular weight.

The following examples illustrate the invention. In these examples, all parts are by weight.

EXAMPLE 1

One hundred parts of $\alpha$, $\alpha$-dimethyl-$\beta$-propiolactone from which such impurities as water and active hydrogen had been removed by distillation in the presence of tolylene diisocyanate, 100 parts of toluene from which such impurities as water and active hydrogen had been removed by distillation in the presence of metallic sodium, and a molecular weight-controlling agent diluted with toluene were charged into a reactor, and the temperature was elevated to 100° C. while stirring, and then 0.185 part of trinormal butylamine (polymerization catalyst) was added thereto.

The mixture was stirred for 6 hours at 100° C. The reaction mass was converted into powdery polymer. This polymer was washed with methanol, filtered and then dried at 80° C. under a reduced pressure. The intrinsic viscosity was measured at 30° C. in a mixed solvent of 6 parts of phenol and 4 parts of orthochlorophenol. The effects of the compounds used as molecular weight controlling agents were as shown in table 1. In table 1 are also given the melt viscosities at 265° C. of the obtained polymers as measured with a flow tester.

TABLE 1

| Experiment No. | Molecular weight controlling agent | Amount (parts) | Catalyst (parts) | Intrinsic viscosity (dl./g.) | Melt viscosity (poises at 265° C.) |
|---|---|---|---|---|---|
| 1-1 | None | | 0.185 | 7.2 | |
| 1-2 | Acetic anhydride | 0.0204 | 0.185 | 3.05 | 2400 |
| 1-3 | Phenol | 0.094 | 0.185 | 2.50 | 1500 |
| 1-4 | Isobutyric acid | 0.088 | 0.185 | 2.98 | 2300 |
| 1-5 | Acetic acid | 0.064 | 0.185 | 3.10 | 2500 |
| 1-6 | Isobutyl aldehyde | 0.072 | 0.185 | 4.15 | 6000 |
| 1-7 | Dimethyl sulfoxide | 0.156 | 0.185 | 2.90 | 2100 |
| 1-8 | Benzoic acid | 0.0611 | 0.185 | 3.00 | 2300 |

TABLE 1—Continued

| 1-9 | Acetaldehyde | 0.0396 | 0.185 | 2.91 | 2100 |
|---|---|---|---|---|---|
| 1-10 | Phthalic anhydride | 0.209 | 0.185 | 3.03 | 2350 |
| 1-11 | Benzaldehyde | 0.212 | 0.185 | 3.07 | 2500 |
| 1-12 | -monochloropivalic acid | 0.150 | 0.185 | 3.02 | 2350 |

EXAMPLE 2

A polymerization reaction was conducted under the same conditions as in example 1 except that a monomer (whose purity was different from that in example 1) purified in the same manner as in example 1 except that the distillation was carried out in the absence of tolylene diisocyanate was used and that the amount of acetic anhydride was varied. The intrinsic viscosities of the resulting polymers are shown in table 2.

TABLE 2

| Experiment No. | Molecular weight controlling agent | Amount (parts) | Intrinsic viscosity (dl./g.) |
|---|---|---|---|
| 2-1 | Acetic anhydride | 0 | 4.02 |
| 2-2 | Acetic anhydride | 0.0204 | 2.60 |
| 2-3 | Acetic anhydride | 0.0510 | 1.59 |
| 2-4 | Acetic anhydride | 0.102 | 1.04 |
| 2-5 | Acetic anhydride | 0.153 | 0.80 |
| 2-6 | Acetic anhydride | 0.204 | 0.64 |

From the results in table 2, it is seen that, the larger the amount of acetic anhydride, the lower the molecular weight. Thus, by only varying the amount of acetic anhydride, polymerization degrees can readily be controlled.

It will also be noted that, though the system of Experiment No. 2-1 was of exactly the same conditions as of Experiment No. 1-1 in example 1, the intrinsic viscosities of the obtained polymers are different. This well indicates the fact that, as explained hereinbefore, depending on the purity of the monomer, the molecular weight varies in the polymerization of $\alpha$, $\alpha$-dialkyl-$\beta$-propiolactone.

EXAMPLE 3

A polymerization was conducted under the same conditions as in example 1 except that the amount of isobutylaldehyde was varied.

The values of the intrinsic viscosity of the obtained poly-$\alpha$, $\alpha$-dimethyl-$\beta$-propiolactones are shown in table 3.

TABLE 3

| Experiment No. | Molecular weight controlling agent | Amount (parts) | Intrinsic viscosity (dl./g.) |
|---|---|---|---|
| 3-1 | Isobutylaldehyde | 0 | 2.64 |
| 3-2 | Isobutylaldehyde | 0.0144 | 2.58 |
| 3-3 | Isobutylaldehyde | 0.0432 | 2.40 |
| 3-4 | Isobutylaldehyde | 0.072 | 2.20 |
| 3-5 | Isobutylaldehyde | 0.100 | 2.17 |
| 3-6 | Isobutylaldehyde | 0.144 | 2.11 |

From the results in table 3, it is evident that, the larger the amount of isobutylaldehyde, the lower the intrinsic viscosity of the polymer. Thus, it will again be understood that, by only varying the amount of isobutylaldehyde, polymers of various polymerization degrees can be easily produced.

EXAMPLE 4

A polymerization was conducted under the same conditions as in Example 1 except that $\alpha,\alpha$-diethyl-$\beta$-propiolactone was used as the monomer and that the amount of phenol was varied.

The values of the intrinsic viscosity of the obtained poly-$\alpha,\alpha$-diethyl-$\beta$-propiolactones are shown in table 4.

TABLE 4

| Experiment No. | Molecular weight controlling agent | Amount (parts) | Intrinsic viscosity (dl./g.) |
| --- | --- | --- | --- |
| 4–1 | None |       | 4.78 |
| 4–2 | Phenol | 0.047 | 2.20 |
| 4–3 | Phenol | 0.094 | 1.75 |
| 4–4 | Phenol | 0.141 | 1.54 |
| 4–5 | Phenol | 0.188 | 1.32 |

From table 4, it observed that, the larger the amount of phenol, the lower the intrinsic viscosity of the polymer.

EXAMPLE 5

One hundred twenty eight parts of $\alpha$-methyl-$\alpha$-propyl-$\beta$-propiolactone, 0.101 part of triethylamine and a solution containing 0.0023 g. of dimethyl sulfoxide in 1 cc. of toluene were mixed. The amount of said solution was varied as shown in table 5. Then toluene was added to the mixture to make the total 200 parts. The mixed solution was subjected to polymerization at 100° C. for 7 hours under stirring to obtain a powdery polymer. This polymer was washed in the same manner as in example 1 and then the intrinsic viscosity was measured. The results are shown in table 5.

TABLE 5

| Amount of dimethyl sulfoxide solution (parts) | Intrinsic viscosity (dl./g.) |
| --- | --- |
| 0 | 2.65 |
| 5 | 2.58 |
| 15 | 2.36 |
| 25 | 2.13 |
| 35 | 1.98 |
| 50 | 1.82 |

As evident also from the results in table 5, the intrinsic viscosity of the polymer reduces with the increase in the amount of dimethyl sulfoxide. By only varying the amount of addition of dimethyl sulfoxide, the polymers of various polymerization degrees can be easily produced.

EXAMPLE 6

In a test tube of a capacity of about 10 cc., 1 cc. of a toluene solution of trinormal butylamine of a concentration of 0.053 g./cc. was added to 2.0 cc. of $\alpha,\alpha$-dimethyl-$\beta$-propiolactone, and to this mixture was added a toluene solution of acetic acid of a concentration of 0.024 g./cc. in an amount varied as in table 6. Toluene was further added to make the total 4.0 cc. The thus prepared mixed solution was well mixed and was left standing at 75° C. for 20 hours to cause polymerization. The polymer in the form of a block was removed from the test tube, washed with acetone and dried at 80° C. under a reduced pressure.

The intrinsic viscosity of the polymer was measured by the same method as in example 1. The results are shown in table 6.

TABLE 6

| Amount of acetic acid solution (c.c.) | Intrinsic viscosity (dl./g.) |
| --- | --- |
| 0 | 3.21 |
| 0.1 | 3.01 |
| 0.3 | 2.80 |
| 0.5 | 2.67 |
| 0.7 | 2.51 |
| 1.0 | 2.30 |

As evident also from the results in table 6, even at a polymerization temperature of 75° C., the intrinsic viscosity reduces with the increase of the amount of acetic acid. Thus, by only varying the amount of acetic acid, polymers of various polymerization degrees can be easily produced.

EXAMPLE 7

A polymerization was conducted under the same conditions as in example 6 except that a toluene solution of acetic anhydride of a concentration of 0.004 g./cc. was added in place of the acetic acid solution.

The results are shown in table 7.

TABLE 7

| Acetic anhydride solution (c.c.) | Intrinsic viscosity (dl./g.) |
| --- | --- |
| 0 | 3.02 |
| 0.1 | 2.40 |
| 0.3 | 1.32 |
| 0.5 | 0.97 |
| 0.7 | 0.79 |
| 1.0 | 0.63 |

Here again, even at a polymerization temperature of 75° C., the intrinsic viscosity of the polymer reduces with the increase of the amount of acetic anhydride.

EXAMPLE 8

In a test tube of a capacity of about 10 cc., there were mixed 2.0 cc. of $\alpha,\alpha$-dimethyl-$\beta$-propiolactone and 2.0 cc. of toluene, and to this mixture was added monochloracetic acid of dichloracetic acid as a chain-increasing agent (molecular weight-controlling agent). Further, 3.7 mg. of trinormal butylamine were added to the mixture. The solution was left standing at 100° C. for 5 hours to cause polymerization. After the polymerization, the polymer was washed and dried under the same conditions as in example 6. The intrinsic viscosities of various poly-$\alpha,\alpha$-dimethyl-$\beta$-propiolactones thus obtained are shown in table 8.

TABLE 8

| Experiment No. | Molecular weight controlling agent | Amount (mg.) | Intrinsic viscosity (dl./g.) |
| --- | --- | --- | --- |
| 8–1 | None |       | 3.37 |
| 8–2 | Monochloracetic acid | 0.19 | 2.33 |

TABLE 8—Continued

| | | | |
|---|---|---|---|
| 8-3 | Monochloracetic acid | 0.57 | 1.88 |
| 8-4 | Monochloracetic acid | 0.95 | 1.42 |
| 8-5 | Monochloracetic acid | 1.32 | 1.34 |
| 8-6 | Monochloracetic acid | 1.89 | 1.17 |
| 8-7 | Dichloracetic acid | 0.26 | 2.40 |
| 8-8 | Dichloracetic acid | 1.29 | 2.25 |
| 8-9 | Dichloracetic acid | 2.58 | 1.52 |

From the above results, it will be apparent that monochloracetic acid and dichloracetic acid have an effect to control the molecular weight of the polymer.

Further, in order to investigate the reproductivity of the effect, the reaction system of Experiment No. 8-3 in table 8 was scaled up to be 1,000 times, and the polymerization was carried out under the conditions shown in table 9.

The intrinsic viscosity of the resulting polymer was 1.88, which well accorded with the result of Experiment No. 8-3.

TABLE 9

| | |
|---|---|
| $\alpha,\alpha$-dimethyl-$\beta$-propiolactone | 2.0 l. |
| Toluene | 2.0 ml. |
| Trinormal butylamine | 3.7 g. |
| Monochloracetic acid | 0.57 g. |
| Polymerization temperature | 100° C. |
| Polymerizing time | 6 hr. |

EXAMPLE 9

A mixture of 100 parts of $\alpha$-dimethyl-$\beta$-propiolactone and 86.6 parts of toluene was placed in a polymerization reactor, and predetermined amounts of a polymerization catalyst and a molecular weight-controlling agent were added thereto. The mixture was left standing at 80° C. for 24 hours to cause polymerization.

The produced polymer was washed with methanol, filtered and then dried at 80° C. under a reduced pressure. The intrinsic viscosity of the polymer was measured in the same manner as in example 1. The results are shown in Table 10. It will be noted from these results that, regardless of the polymerization catalyst to be used, the presence of the molecular weight-controlling agent of this invention acts to control the intrinsic viscosity or the molecular weight (polymerization degree) of the polymer.

TABLE 10

| Polymerization catalyst | Amount (parts) | Molecular weight controlling agent | Amount (parts) | Intrinsic viscosity (dl./g.) |
|---|---|---|---|---|
| Calcium acetate | 0.98 | Acetic anhydride | 0 | 2.60 |
| | | " | 0.0204 | 1.54 |
| | | " | 0 | 2.82 |
| n-butyl lithium | 0.06 | " | 0.0204 | 1.65 |
| | | Phenol | 0 | 2.31 |
| Phenyl magnesium bromide | 0.21 | " | 0.094 | 1.45 |
| | | " | 0 | 4.05 |
| Tributyl phosphine | 0.186 | " | 0.094 | 2.63 |

As evident from these various examples, in the polymerization of $\alpha, \alpha$-disubstituted-$\beta$-propiolactones, when molecular weight controlling agent is not added, there are disadvantages that a polymer of a comparatively high polymerization degree will be produced and that the reproductivity of the molecular weight will not be obtained in each batch.

On the other hand, when a proper amount of the molecular weight controlling agent according to the present invention is added, the polymer having desired polymerization degree can be easily produced. Further, the reproductivity of this effect is very high.

What we claim is:

1. A method of producing fiber or film forming high molecular weight poly-$\alpha$, $\alpha$-disubstituted-$\beta$-propiolactones by ring-opening polymerizing an $\alpha$, $\alpha$-disubstituted-$\beta$-propiolactone of the formula:

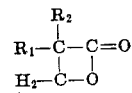

wherein each of $R_1$ and $R_2$ is a member selected from the group consisting of aryl groups and alkyl groups of 1–4 carbon atoms, in the presence of an anionic polymerization catalyst characterized by conducting the polymerization in the presence of a molecular weight controlling agent selected from the group consisting of aldehydes dimethyl sulfoxide and diethyl sulfoxide, in order to control the molecular weight of the polymer.

2. A method as claimed in claim 1 wherein the aldehydes are acetaldehyde, propionaldehyde, butyraldehyde, valeraldehyde, caproaldehyde, enanthaldehyde, caprylaldehyde, pelargonaldehyde, caprinaldehyde, palmitaldehyde, stearaldehyde and benzaldehyde.

3. A method as claimed in claim 1 wherein the sulfoxides are dimethyl sulfoxide and diethyl sulfoxide.

4. A method as claimed in claim 1 wherein the anionic polymerization catalyst is selected from the group consisting of tri-n-butyl amine, triethyl amine, calcium acetate, n-butyl lithium, phenyl magnesium bromide and tributyl phosphine.

5. A method as claimed in claim 1 wherein the polymerization is conducted at a temperature of 0°–150° C., preferably 50°–120bL C.